(12) United States Patent
Wu et al.

(10) Patent No.: US 8,228,994 B2
(45) Date of Patent: Jul. 24, 2012

(54) MULTI-VIEW VIDEO CODING BASED ON TEMPORAL AND VIEW DECOMPOSITION

(75) Inventors: Feng Wu, Beijing (CN); Shipeng Li, Redmond, WA (US); Wenxian Yang, Singapore (SG); Yan Lu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1603 days.

(21) Appl. No.: 11/290,622

(22) Filed: Nov. 30, 2005

(65) Prior Publication Data

US 2006/0262856 A1   Nov. 23, 2006

Related U.S. Application Data

(60) Provisional application No. 60/683,113, filed on May 20, 2005.

(51) Int. Cl.
*H04N 7/12* (2006.01)
*H04N 11/02* (2006.01)
*H04N 11/04* (2006.01)
*H04N 9/04* (2006.01)

(52) U.S. Cl. ......... 375/240.19; 375/240.23; 375/240.24; 375/240.16; 348/207.99

(58) Field of Classification Search ............. 348/207.99; 375/240.19, 240.24, 240.23
See application file for complete search history.

(56) References Cited

U.S. PATENT DOCUMENTS

| | | | |
|---|---|---|---|
| 2003/0095119 A1* | 5/2003 | Jeong et al. | 345/419 |
| 2003/0202592 A1* | 10/2003 | Sohn et al. | 375/240.16 |
| 2006/0132610 A1* | 6/2006 | Xin et al. | 348/207.99 |

OTHER PUBLICATIONS

Ruiqin et al. (Barbell Lifting Wavelet Transform for Highly Scalable Video Coding; Picture Coding Symposium, Dec. 2004; 6 pages).*
"Optimization Model," Version 2.0, Oct. 26, 2000 Draft, International Organisation for Standardisation, Coding of Moving Pictures and Audio, ISO/IEC JTC1/SC29/WG11 N3675, 12 pages.
"Preliminary Call for Evidence on Multi-View Coding," International Organisation for Standardisation, ISO/IEC JTC1/SC29/WG11 N6494, Coding of Moving Pictures and Audio, Jul. 2004, 7 pages.
"Requirements on Multi-view Video Coding," International Organisation for Standardisation, ISO/IEC JTC1/SC29/WG11 N6501, Coding of Moving Pictures and Audio, Jul. 2004, 3 pages.
Grammalidis, Nikos, Dimitris Beletsiotis and Michael G. Strintzis, "Sprite Generation and Coding in Multiview Image Sequences," Oct. 20, 1999, IEEE Transactions of Circuits and Systems for Video Technology, vol. 10, No. 2, Mar. 2000, © 2000 IEEE, pp. 302-311.
Li, Guoping and Yun He, "A Novel Multi-View Video Coding Scheme Based on H.264," ICICS-PCM 2003, 1C2.8, © 2003 IEEE, pp. 493-497.

(Continued)

*Primary Examiner* — King Poon
*Assistant Examiner* — Neil R McLean
(74) *Attorney, Agent, or Firm* — Perkins Coie LLP

(57) ABSTRACT

A method and system for coding a multi-view video having multiple views based on temporal decomposition and view decomposition is provided. A multi-view video coding ("MVC") system provides a disparity compensated view filter based on a generic lifting transform that is used in conjunction with a motion compensated temporal filtering and a two-dimensional spatial discrete wavelet transform to decompose a multi-view video into four-dimensional wavelet coefficients. The MVC system performs a hierarchy of decompositions for each view that may be a combination of temporal decompositions and view decompositions.

13 Claims, 11 Drawing Sheets

OTHER PUBLICATIONS

Lim, JeongEun et al., "A multiview sequence CODEC with view scalability," Oct. 2, 2003, Signal Processing: Image Communication, vol. 19, 2004, © 2003 Elsevier B.V., pp. 239-256.

Wang, Ru-Shang and Yao Wang, "Multiview Video Sequence Analysis, Compression, and Virtual Viewpoint Synthesis," Sep. 30, 1999, IEEE Transactions on Circuits and Systems for Video Technology, vol. 10, No. 3, Apr. 2000, © 2000 IEEE, pp. 397-410.

Xiong, Ruiqin et al., "Barbell Lifting Wavelet Transform for Highly Scalable Video Coding," Picture Coding Symposium, Dec. 2004, 6 pages.

Xu, Jizheng et al., "Three-Dimensional Embedded Subband Coding with Optimized Truncation (3-D ESCOT)," Applied and Computational Harmonic Analysis, vol. 10, 2001, © 2001 by Academic Press, pp. 290-315.

Yang, Wenxian and Ngan King Ngi, "MPEG-4 Based Stereoscopic Video Sequences Encoder," ICASSP 2004, May, vol. 3, © 2004 IEEE, pp. 741-744.

* cited by examiner

MULTI-VIEW VIDEO CODING BASED ON TEMPORAL AND VIEW DECOMPOSITION

CROSS-REFERENCE TO RELATED APPLICATION(S)

This application claims the benefit of U.S. Provisional Application No. 60/683,113, entitled, "4D Wavelet Techniques for Multi-View Video Coding" and filed on May 20, 2005, which is hereby incorporated by reference.

BACKGROUND

Multi-view video coding ("MVC") is a key technology for interactive multimedia applications such as free-viewpoint video ("FVV") or free-viewpoint television ("FTV"), 3D television ("3DTV"), immersive teleconference, surveillance, and so on. A multi-view video is typically captured by multiple cameras from different angles and locations at the same time. For example, a multi-view video of a baseball game may be generated by three cameras: one located behind home plate, one located near first base, and one located near third base. Because of the vast amounts of data needed to represent a multi-view video, it is important have compression techniques that allow for efficient storage and transmission of a multi-view video.

The multi-view video coding techniques for generic multi-view videos typically use a traditional block-based hybrid video coding. Several standards have been proposed that provide a framework for multi-view video coding (e.g., MPEG-2 multi-view profile ("MVP") and MPEG-4 multiple auxiliary components ("MAC")). Based on the framework provided by these standards, some standard-compatible MVC schemes have been proposed. (See, Puri, R. V. Kollarits and B. G. Haskell, "Basics of stereoscopic video, new compression results with MPEG-2 and a proposal for MPEG-4," Signal Processing: Image Communication, vol. 10, pp. 201-234, 1997; J. Lim, K. Ngan, W. Yang, and K. Sohn, "Multiview sequence CODEC with view scalability," Signal Processing: Image Communication, vol. 19, no. 3, pp. 239-256, March 2004; and W. Yang and K. Ngan, "MPEG-4 based stereoscopic video sequences encoder," in Proc. ICASSP 2004, vol. 3, pp. 741-744, May 2004.) To further improve coding efficiency, other techniques have been proposed that extend the syntaxes or semantics of these standards. (See, Y. Choi, S. Cho, J. Lee, and C. Ahn, "Field-based stereoscopic video codec for multiple display methods," in Proc. ICIP 2002, vol. 2, pp. 253-256, NY, USA, September 2002; X. Guo, and Q. Huang, "Multiview video coding based on global motion model," Lecture Notes in Computer Sciences, vol. 3333, pp. 665-672, December 2004; Li, Y. He, "A novel multiview video coding scheme based on H.264," in Proc. ICICS-PCM 2003, pp. 493-497, Singapore, December 2003; and ISO/IEC JTC1/SC29WG11 M11700, "Responses received to CfE on multi-view video coding," Hong Kong, China, January 2005.) In particular, some MPEG-4 AVC/H.264-based MVC techniques have been proposed. (See, X. Guo and Q. Huang, "Multiview video coding based on global motion model," Lecture Notes in Computer Sciences, vol. 3333, pp. 665-672, December 2004; and Li, Y. He, "A novel multiview video coding scheme based on H.264," in Proc. ICICS-PCM 2003, pp. 493-497, Singapore, December 2003.)

Most of the multi-view video coding techniques are based on the traditional hybrid video coding and have employed multi-hypothesis prediction, in which either temporal or view correlation is utilized in terms of the coding cost. The performance of the multi-view video coding techniques is usually evaluated by comparing them with the simulcast coding in which each view is independently coded. The existing multi-view video coding techniques have not shown a significant or consistent improvement in coding efficiency over simulcast video coding.

Other limitations of typical multi-view video coding techniques prevent them from achieving a high coding efficiency in a practical application. For example, in the conventional multiple reference multi-view video coding schemes, the saving in bit rate comes from the auxiliary views, where every auxiliary view is always predicted from the main view. When the number of views increases, the performance gain compared to the simulcast coding also increases only proportionally, because only the correlation between every auxiliary view and the main view is exploited.

SUMMARY

A method and system for coding a multi-view video having multiple views based on temporal decomposition and view decomposition is provided. A multi-view video coding ("MVC") system provides a disparity compensated view filter based on a generic lifting transform that is used in conjunction with a motion compensated temporal filtering and a two-dimensional spatial discrete wavelet transform to decompose a multi-view video into four-dimensional wavelet coefficients. The MVC system performs a hierarchy of decompositions for each view that may be a combination of temporal decompositions and view decompositions. The MVC system may select to use temporal or view decomposition based on analysis of the correlation between the frame being decomposed and temporally adjacent and view adjacent frames. The MVC system also generates a temporal disparity (also referred to as "motion compensation") vector from one frame of a view to the next and a view disparity vector between the frames of different views depending on whether temporal or view decomposition is selected.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for coding a multi-view video having multiple views based on temporal decomposition and view decomposition is provided. In one embodiment, the multi-view video coding ("MVC") system provides a disparity compensated view filter ("DCVF") based on a generic lifting transform that is used in conjunction with a motion compensated temporal filtering ("MCTF") and a two-dimensional (2D) spatial discrete wavelet transform ("DWT") to decompose a multi-view video into four-dimensional (4D) wavelet coefficients. The MVC system encodes as a unit a group of pictures ("GOP") that includes the pictures of each view for the same time frame. Thus, the MVC system encodes a group of GOPs ("GoGOPs") comprising the pictures of a GOP for each view. The MVC system performs a hierarchy of decompositions for each view that may be a combination of temporal decompositions and view decompositions. The MVC system thus transforms a frame based on a temporally adjacent frame of the same view (i.e., temporal decomposition) or based on a view adjacent frame (i.e., view decomposition). A view adjacent frame is a frame with the same time as, but in a different view from, the frame being decomposed. The MVC system may select to use temporal or view decomposition based on analysis of the correlation between the frame being decomposed and temporally adjacent and view adjacent frames. The MVC system also generates a temporal disparity (also referred to as "motion compensation") vector from one frame of a view to the next and a view disparity vector between the frames of different views depending on whether temporal or view decomposition is selected. The MVC system decomposes the frames of each view of the multi-view video into a high pass subband and a low pass subband for each decomposition level using a lifting transform that factors in the disparity vector. The result of the decomposition is a 2D coefficient image matrix. The MVC system then spatially decomposes the low pass and high pass subbands of a frame into 2D coefficient frames using a 2D spatial discrete wavelet transform ("DWT"). The result of this spatial decomposition is 4D wavelet coefficients (i.e., a 2D matrix based on time and view of 2D wavelet coefficients based on an x-coordinate and y-coordinate) representing the multi-view video. The MVC system then converts the 4D wavelet coefficients to 3D coefficients by scanning the frames of each subband into a sequence of frames. In this way, the MVC system decomposes a multi-view video into 4D wavelet coefficients using temporal or view decomposition at each decomposition level and then encodes the coefficients using a 3D entropy encoding technique.

Figure 1:
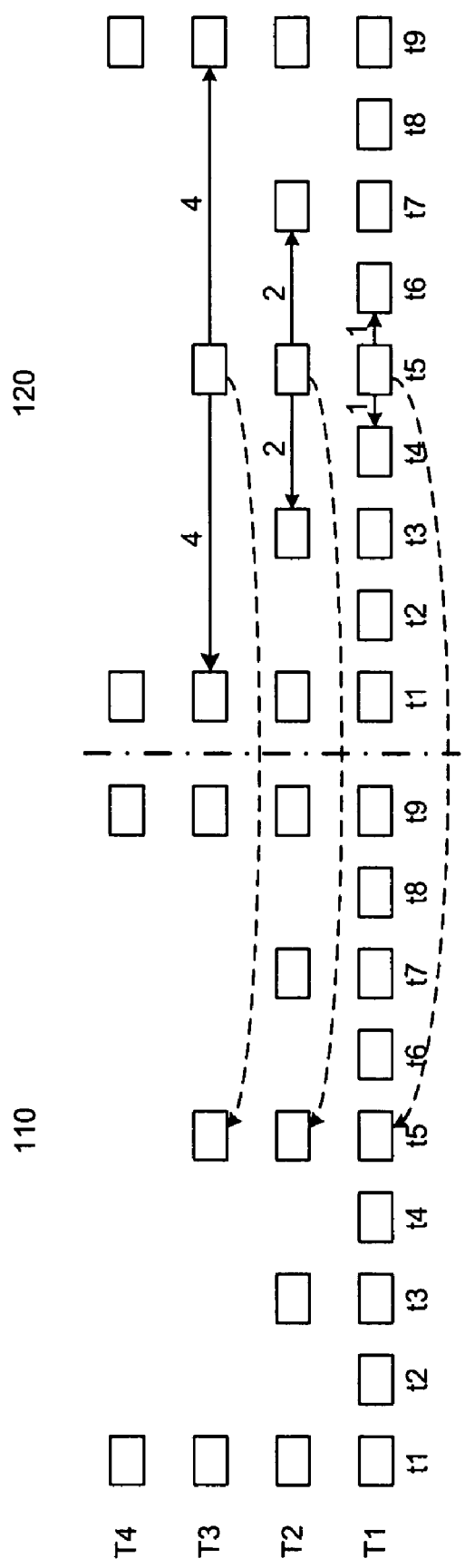
FIG. 1 is a diagram that illustrates the correlation between frames of different views.

FIG. 1 is a diagram that illustrates the correlation between frames of different views. View 110 corresponds to the frames of one view at various decomposition levels, and view 120 corresponds to the frames of another view at the decomposition levels. Each view includes nine frames (i.e., t1-t9) and four decomposition levels (e.g., T1-T4). At lower decomposition levels, the correlation between the adjacent frames within a view would typically be greater than the correlation between the same frames in different views. For example, frame t5 at decomposition level T1 of view 120 is typically more like frames t4 and t6 at decomposition level T1 of view 120 than frame t5 at decomposition level T1 of view 110. However, at higher decomposition levels, the correlation between adjacent frames within a view decreases while the correlation between the corresponding frames in different views may increase. For example, frame t5 at decomposition level T3 of view 120 may have a higher correlation to frame t5 at decomposition level T3 of view 110 than to frame t1 or t9 at decomposition level T3 of view 120. The MVC system takes advantage of the difference in correlation by selectively decomposing views using temporal decomposition or view decomposition at different decomposition levels.

In one embodiment, the MVC system compresses the 4D wavelet coefficients using a 3D embedded subband coding with optimal truncation ("3D-ESCOT") as described in J. Xu, Z. Xiong, S. Li and Y. -Q. Zhang, "Three-dimensional embedded subband coding with optimized truncation (3D ESCOT)," J. Applied and Computational Harmonic Analysis, vol. 10, pp. 290-315, May 2001, and a barbell lifting SVC technique as described in R. Xiong, F. Wu, J. Xu, S. Li and Y. -Q. Zhang, "Barbell lifting wavelet transform for highly scalable video coding," in Proc. PCS 2004, December 2004. The MVC system encodes macroblocks using a global disparity model or a local disparity model depending on which disparity model provides a more effective coding for that macroblock. The MVC system may calculate the global disparity based on characteristics (e.g., angle of view or zoom level) of the cameras of the different views. The MVC system may use a subband technique to reorganize the 4D wavelet coefficients into a 3D structure. The 3D structure may allow the use of a 3D-ESCOT entropy encoding technique.

Figure 2:
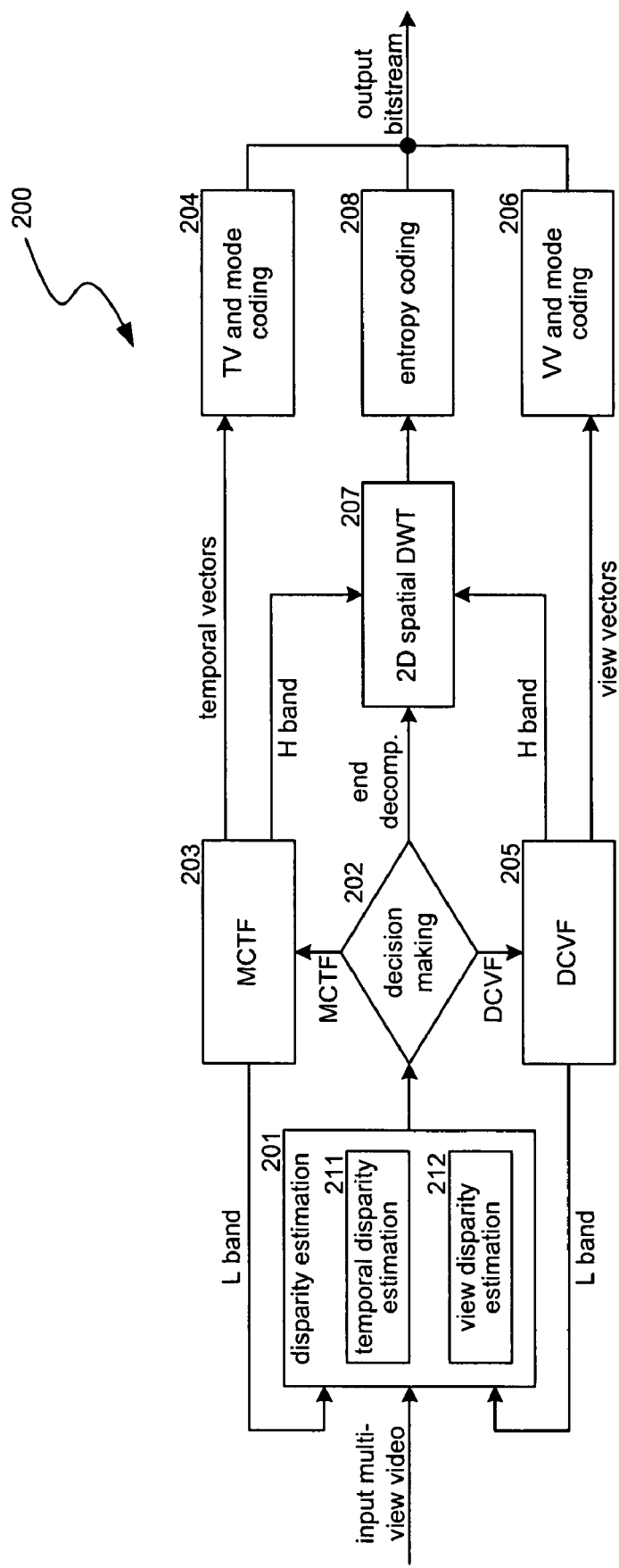
FIG. 2 is a block diagram illustrating components of the MVC system in one embodiment.

FIG. 2 is a block diagram illustrating components of the MVC system in one embodiment. The MVC system 200 includes a disparity estimation component 201, a selection component 202, a motion compensated temporal filtering ("MCTF") component 203, a temporal vector and mode coding component 204, a disparity compensated view filter component ("DCVF") 205, a view vector and mode coding component 206, a discrete wavelet transform ("DWT") component 207, and an entropy encoding component 208. As the multi-view video is received at the MVC system, the disparity estimation component, which includes a temporal disparity estimation component 211 and a view disparity estimation component 212, estimates the effectiveness of transforming the video based on a temporal decomposition or a view decomposition. The selection component selects an estimation and signals the MCTF component or the DCVF component as appropriate. The MCTF component and the DCVF component perform the temporal decomposition and the view decomposition, respectively, and output the high pass subband, low pass subband, and disparity vector. The temporal vector and mode coding component and the view vector and mode coding component encode the vectors and modes. The DWT component inputs the subbands and applies 2D spatial DWT, which is entropy encoded by the entropy encoding component.

The MVC system may be implemented in silicon, using discrete logic, a microprocessor, or other computing devices. The computing device on which the MVC system is implemented may include a central processing unit, memory, input devices (e.g., keyboard and pointing devices), output devices (e.g., display devices), and storage devices (e.g., disk drives). The memory and storage devices are computer-readable media that may contain instructions that implement the MVC system.

The MVC system may be implemented in various operating environments that include personal computers, server computers, multiprocessor systems, microprocessor-based systems, programmable consumer electronics, network PCs, minicomputers, mainframe computers, distributed computing environments that include any of the above systems or devices, and the like.

The MVC system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments and may be implemented in hardware or software.

In one embodiment, the MVC system applies a generic lifting wavelet transform to predict the values in odd frames (i.e., a low pass subband) and to update those predicted values in even frames (i.e., a high pass subband). The MVC system may use a 5/3 biorthogonal filter, a Haar filter, a 9/7 filter, and so on. A lifting transform can be represented by the following equation:

$$\begin{cases} H_k[n] = I_{2k+1}[n] - \frac{1}{2}(I_{2k}[n] + I_{2k+2}[n]) \\ L_k[n] = I_{2k}[n] + \frac{1}{4}(H_{k-1}[n] + H_k[n]) \end{cases} \quad (1)$$

where $H_k[n]$ represents a high pass frame, $L_k[n]$ represents a low pass frame, and $I_{2k}[n]$ and $I_{2k+1}[n]$ represent the values of even and odd frames, respectively. The lifting transform can factor in temporal disparity (e.g., motion compensation) using the following equation:

$$\begin{cases} H_k[n] = I_{2k+1}[n] - \frac{1}{2}(M_{2k \to 2k+1}(I_{2k})[n] + M_{2k+2 \to 2k+1}(I_{2k+2})[n]) \\ L_k[n] = I_{2k}[n] + \frac{1}{4}(M_{2k-1 \to 2k}(H_{k-1})[n] + M_{2k+1 \to 2k}(H_k)[n]) \end{cases} \quad (2)$$

where $M_{2k \to 2k+1}$ and $M_{2k-1 \to 2k}$ represent the temporal disparity between adjacent frames. Although the mapping based on temporal disparity may result in a more effective transform, the mapping information needs to be transmitted along with the transform coefficients.

Figure 3:
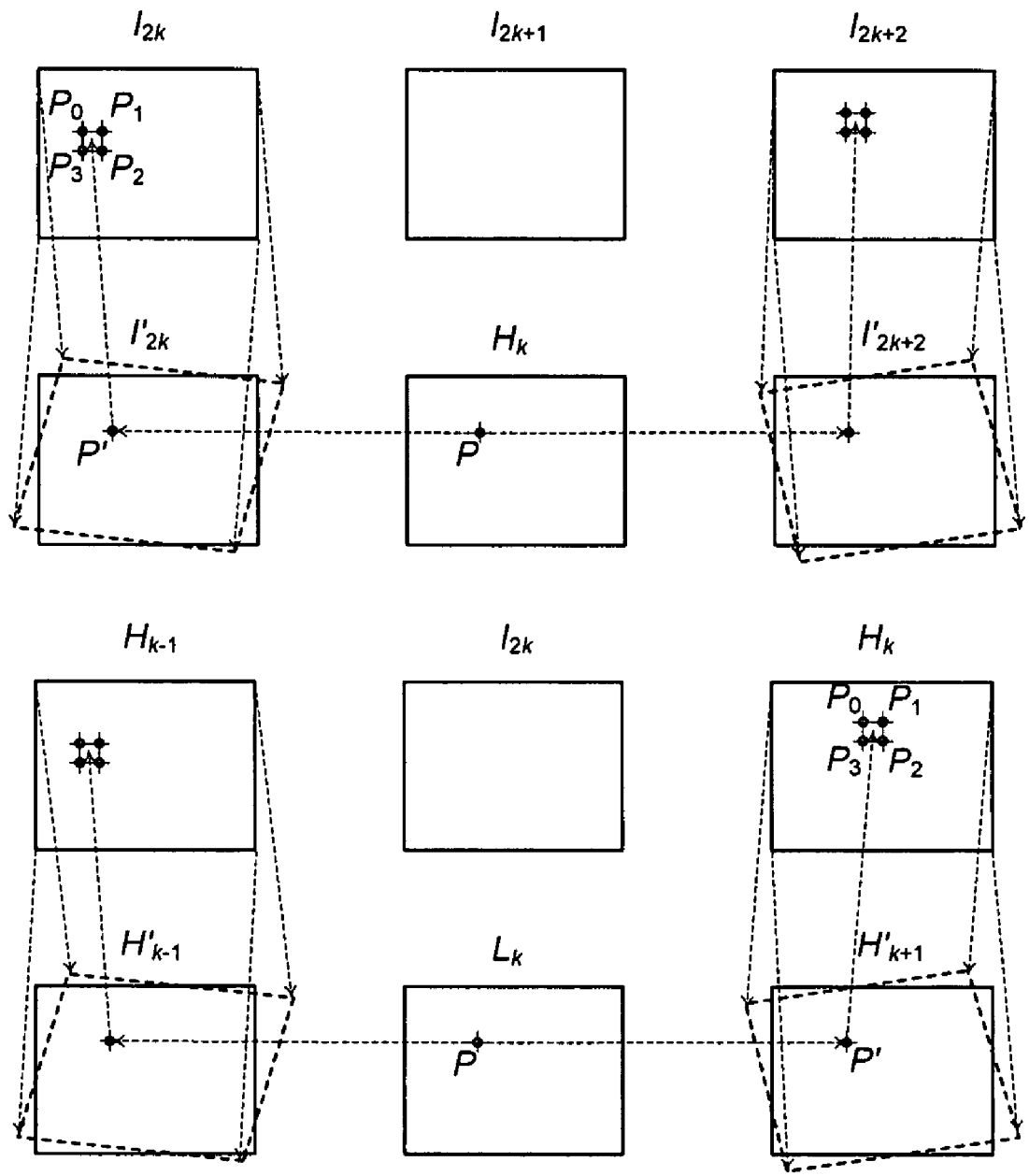
FIG. 3 is a diagram that illustrates the prediction and update process of the MVC system in one embodiment.

In one embodiment, the MVC system represents a global view disparity between adjacent views based on the different angles and locations of the cameras used to generate the views. The MVC system may represent the global view disparity based on a six-parameter affine model. The MVC system uses a warping-based lifting transform for the DCVF component that uses the global view disparity. The MVC system may derive the global view disparity based on camera characteristics or may employ a global motion estimation ("GME") technique. To avoid the effects of distorted image areas from wide-angle lenses of cameras, the MVC system excludes a 16-pixel wide boundary of each frame when calculating model parameters. FIG. 3 is a diagram that illustrates the prediction and update process of the MVC system in one embodiment.

The MVC system predicts the values of an odd frame by warping the values of adjacent frames based on the global view disparity using a bilinear interpolation. The MVC system uses a low pass extrapolation ("LPE") padding technique of MPEG-4 object-based video coding to fill in blank regions that do not correspond to any pixels in the raw frames (e.g., white regions). The MVC system applies Equation 2 to calculate the high pass subband. The MVC system updates the predicted values in the even frames by warping the values of adjacent high pass frames based on the global view disparity using bilinear interpolation.

In one embodiment, the MVC system uses local view disparity to improve the performance of disparity estimation. The MVC system divides the frame into macroblocks that can each have a separate local view disparity. The MVC system encodes whether each macroblock is encoded using a global view disparity or a local view disparity. If encoded using a local view disparity, the MVC system encodes the local view disparity with the macroblock. The MVC system implements the predicting for both local disparity compensated macroblocks and global disparity compensated macroblocks using the same lifting transform. In particular, the MVC system may use the lifting steps of the MCTF component for the local disparity compensated macroblocks. The MVC system may use the lifting steps from the global warping based DCVF component for the global disparity compensated macroblocks. Since a predicted value for both local disparity compensated macroblocks and global disparity compensated macroblocks corresponds to at most four pixels in the original frame, the MVC system can use a bilinear interpolation technique such as the fast sprite warping scheme MPEG-4 for global disparity compensated macroblocks.

In one embodiment, the MVC system employs an energy distributed update ("EDU") technique for updating local disparity compensated macroblocks in which every pixel in the high pass frame updates at most four pixels in the even frame under the energy distribution constraint. (See, B. Feng, J. Xu, F. Wu, and S. Yang, "Energy distributed update steps (EDU) in lifting based motion compensated video coding," in Proc. ICIP 2004, pp. 2267-2270, Singapore, October 2004.) To be consistent with the updating operation for local disparity compensated macroblocks, the MVC system updates the global disparity compensated macroblocks to be EDU-based as follows. Each value in a high pass frame is scaled by a weight and added to at most four pixels in a low pass frame. The MVC system calculates the weight according to the following equation:

$$w_i = \begin{cases} (1 - |x - x_i|) \cdot (1 - |y - y_i|) & \text{if } |x - x_i| \le 1 \ \& |y - y_i| \le 1 \\ 0 & \text{otherwise} \end{cases} \quad (3)$$

where x and y represent the position of pixel at x and y of the macroblock and $x_i$ and $y_i$ represent the position in the high pass frame in terms of the affine model.

Figure 4:
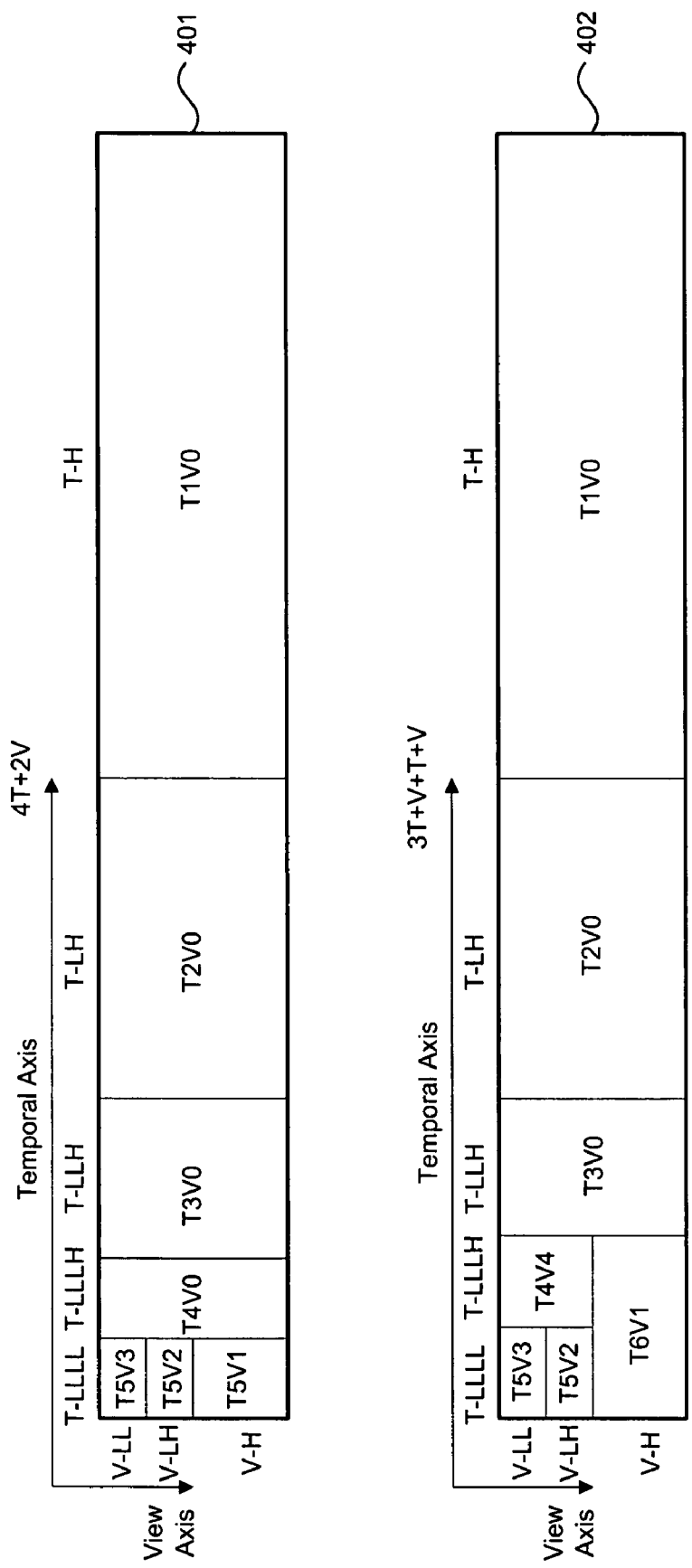
FIG. 4 illustrates temporal and view decompositions of the MVC system in one embodiment.

FIG. 4 illustrates temporal and view decompositions of the MVC system in one embodiment. The MVC system uses a temporal decomposition for the lower decomposition levels and uses a view decomposition for the higher decomposition levels. For example, the MVC system may apply an MCTF to the four lowest decomposition levels and DCVF to the two highest decomposition levels. The MVC system thus assumes that temporal correlation is higher than view correlation in the four lowest decomposition levels and that the view correlation is higher than a temporal correlation on the two highest decomposition levels. The diagram 401 illustrates the decomposition resulting from applying a temporal decomposition at the four lowest decomposition levels and a view decomposition at the two highest decomposition levels represented as "4T+2V." The MVC system preserves the high pass subband for each level and decomposes the low pass subband at the next level. "T-LLLL" represents the low pass subband of the fourth temporal decomposition, which is decomposed into "V-H," "V-LH," and "V-LL" with "V-LL" representing the low pass subband and "V-LH" representing the high pass subband of the second view decomposition.

Alternatively, the MVC system uses an adaptive decomposition technique which selects the temporal decomposition or view decomposition at a decomposition level based on an estimate of the correlations at that decomposition level. To evaluate the correlation, the MVC system defines a cost function by the following equation:

$$HCost=SAD(H)+\lambda R(MV) \qquad (4)$$

where HCost represents the nearness of the high pass subband to zero, SAD(H) represents the sum of the absolute differences of samples in the high pass subband H obtained from the decomposition, R(MV) represents the bit rate for coding the temporal disparity or view disparity vectors, and $\lambda$ represents a Lagrangian parameter. The cost for a macroblock is the average of the HCost values. Table 1 illustrates some sample statistics from sample multi-view videos.

TABLE 1

| Video | Direction | 1st | 2nd | 3rd | 4th | 5th | 6th | Selected Structure |
|---|---|---|---|---|---|---|---|---|
| 1 | Temporal | 305.24 | 416.60 | 564.94 | 735.85 | 745.82 | 926.55 | 3T + V + 2T |
|   | View | 732.24 | 722.66 | 715.29 | 714.93 | 970.40 | 975.16 | |
| 2 | Temporal | 246.91 | 233.70 | 308.81 | 372.53 | 689.46 | 1119.03 | 5T + V |
|   | View | 902.88 | 900.05 | 900.81 | 898.01 | 903.90 | 914.72 | |
| 3 | Temporal | 531.31 | 759.03 | 1089.23 | 1486.69 | 1508.57 | 1981 | 3T + V + T + V |
|   | View | 1201.53 | 1201.88 | 1201.88 | 1202.48 | 1595.53 | 1577.02 | |

Each row corresponds to a separate video and contains the costs associated with temporal and view decompositions at each of six decomposition levels. As illustrated by the first row corresponding to video 1, the temporal cost of the first decomposition level is 305.24 and the view cost at that decomposition level is 732.24. Thus, the MVC system selects temporal decomposition for the first decomposition level. As illustrated by the row for video 1, the view cost of the fourth decomposition level is 714.93 and a temporal cost is 735.85. As a result, the MVC system selects view decomposition for the fourth decomposition level. The selected decomposition levels for video 1 are represented by the last column in which "3T+V+2T" indicates that the MVC system selected temporal decomposition for the first three decomposition levels, view decomposition for the fourth decomposition level, and temporal decomposition for the final two decomposition levels. The diagram 402 illustrates the decomposition levels for video 3 that applies temporal decomposition to the lowest three levels and the fifth level and applying view decomposition to the fourth and sixth levels.

The MVC system defines various macroblock modes for coding of temporal disparity information. Conventional MCTF uses the modes of FwD, BwD, DirectT, Skip, and BiD. In the FwD and BwD modes, the forward or backward temporal disparity prediction is used in the lifting steps. In the BiD mode, bidirectional disparity prediction is used in the lifting steps. In Skip mode, no temporal disparity prediction factor needs to be encoded, but a bidirectional motion-compensated prediction is used that is derived from surrounding macroblocks. In DirectT mode, the forward or backward temporal disparity prediction is used in the lifting steps, but the vectors have the same absolute value but opposite sign. Thus, only one temporal disparity vector needs to be encoded.

Figure 5:
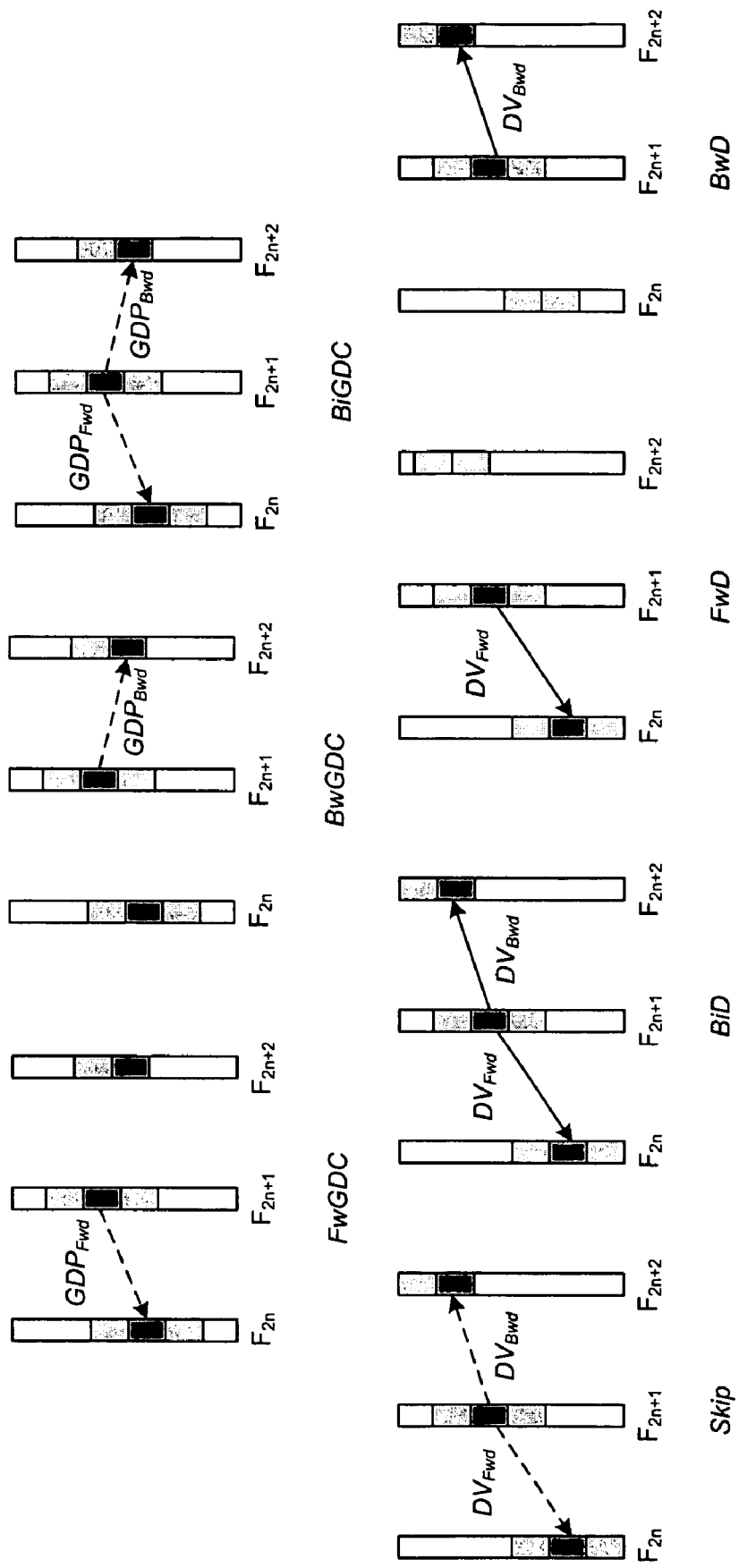
FIG. 5 is a diagram that illustrates the modes for macroblock encoding of the MVC system in one embodiment.

The MVC system uses new modes of FwGDC, BwGDC, and BiGDC for encoding global disparity information. In the FwGDC, BwGDC, and BiGDC modes, forward, backward, and bidirectional global disparity compensation is used in the lifting steps. Since the global temporal disparity information is encoded in frame headers, the MVC system does not store vectors for these modes along with the macroblocks. The MVC system also does not use the DirectT mode for local disparity for local temporal disparity information because consecutive view frames are not as continuous as consecutive temporal frames. FIG. 5 is a diagram that illustrates the modes for macroblock encoding of the MVC system in one embodiment.

The MVC system uses a rate-distortion optimization ("RDO") to select the mode for macroblocks. The MVC system considers the seven macroblock modes in a variable length code ("VLC") design. The MVC system employs the Golumb-Rice codes by ordering the seven modes based on their statistical probabilities. The MVC system merges the FwGDC and BwGDC modes into an SiGDC mode because they have similar statistical probabilities and should be assigned the same code length. Thus, if SIGDC is selected, then the MVC system uses an additional flag to differentiate FwGDC and BwGDC. If a frame does not have a right reference, then the MVC system uses one bit to signal the mode for these frames.

The MVC system converts the temporal/view decomposition to 4D wavelet coefficients before entropy encoding. Since each subband after temporal/view decomposition is two-dimensional, the MVC system scans the frames in each subband into a sequence of frames to reorganize the 4D wavelet coefficients into 3D wavelet coefficients so that they can be encoded using a 3D-ESCOT technique. The MVC system selects a scan order of temporal scan ("T-scan"), view scan ("V-scan"), or head-to-tail scan. The MVC system uses T-scan and V-scan for temporal subbands and view subbands, respectively, because of the strong correlation between adjacent frames. Since the frames in a transition from a row to another row in a temporal subband or from a column to another column in a view subband may have very little correlation, the MVC system may also use a head-to-tail scan. In particular, the MVC system scans temporal subbands in temporal order for even rows and inverse temporal order for odd rows, and scans view subbands in the view order for even columns and inverse view order for odd columns. The MVC system uses a rate-distortion ("R-D") optimized truncation technique to assemble different subband encoded bits into different layers to improve the overall coding performance. The MVC system truncates different subbands at the same slope of the R-D curves by a weight matrix. The definition of the weight matrix depends on the decomposition structure. For example, the decomposition structure shown in diagram 401 of FIG. 4 represents a "4T+2V" structure and assumes that the 5/3 filter (i.e., ($\frac{1}{2}$, 1, $\frac{1}{2}$) for the low pass synthesis and ($-\frac{1}{8}$, $-\frac{1}{4}$, $\frac{3}{4}$, $-\frac{1}{4}$, $-\frac{1}{8}$) for the high pass synthesis) is used for both MCTF and DCVF. Based on these filter coefficients, the transform gain of each subband in terms of one- or multi-level DWT can be calculated to be, for example, WL=1.5 and WH=0.7188 for the low pass and high pass subbands in one-level DWT, and WLLLL=10.6875 and WLLLH=3.0430 for the low pass and high pass subbands in the four-level DWT. To extend this scheme to the 4D wavelet decomposition structure, the weight of the subband from both MCTF and DCVF is defined as the multiplication of the two weights from the two DWTs. For example, the weight of subband (T-LLLL, V-H) in diagram 401 of FIG. 4 is defined as WLLLH×WH=7.6822. The weight matrix for the whole "4T+2V" decomposition structure is shown in Table 2.

TABLE 2

|        | V (w/o filt.) | V-H    | V-LH   | V-LL    |
|--------|---------------|--------|--------|---------|
| T-H    | 0.7188        | —      | —      | —       |
| T-LH   | 0.9219        | —      | —      | —       |
| T-LLH  | 1.5859        | —      | —      | —       |
| T-LLLH | 3.0430        | —      | —      | —       |
| T-LLLL | —             | 7.6822 | 9.8525 | 29.3906 |

Figure 6:
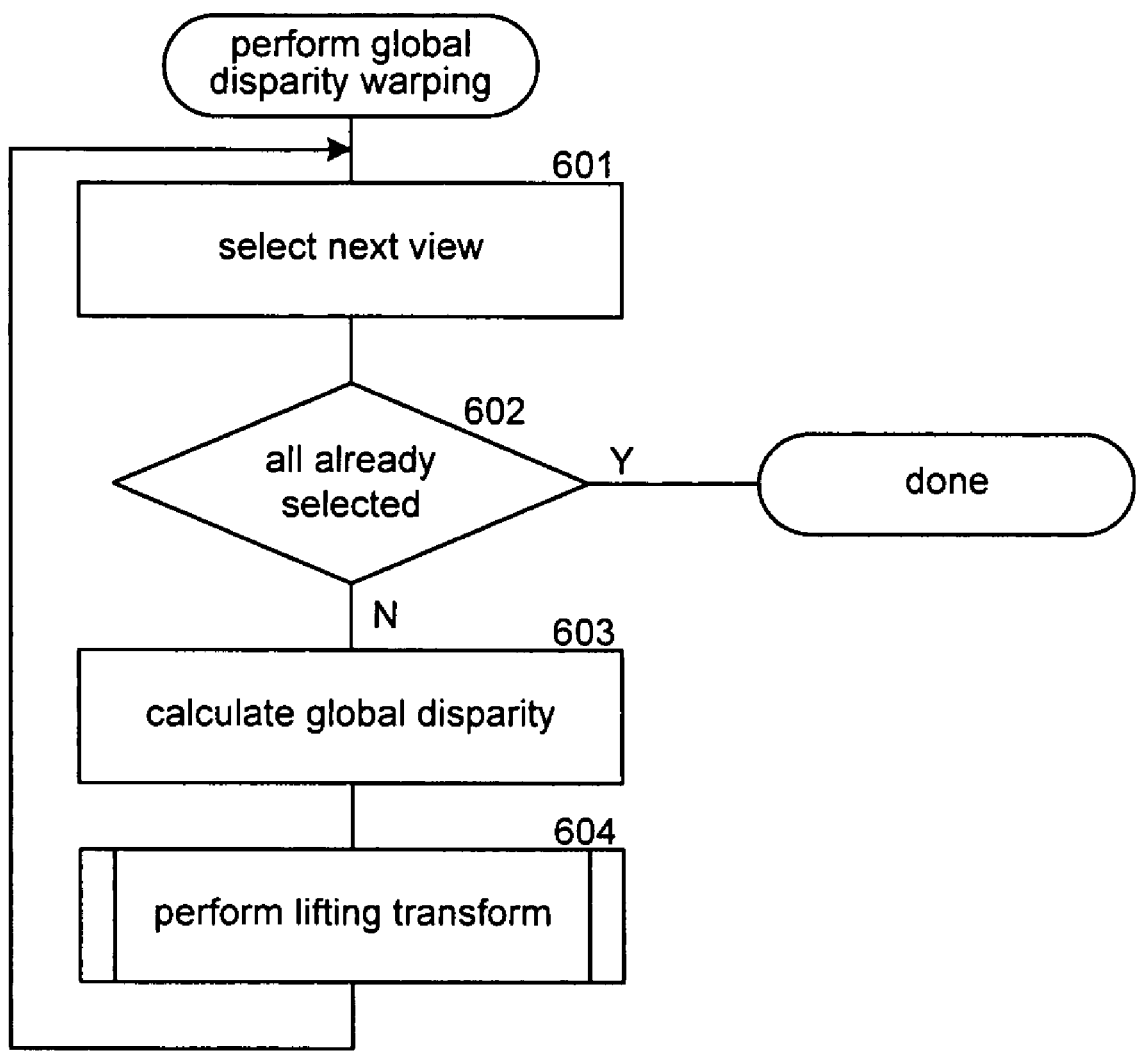
FIG. 6 is a flow diagram that illustrates the processing of a perform global disparity warping component of the MVC system in one embodiment.

FIG. 6 is a flow diagram that illustrates the processing of a perform global disparity warping component of the MVC system in one embodiment. The component loops selecting views and calculating the global disparity and performing the lifting transform. In block 601, the component selects the next view. In decision block 602, if all the views have already been selected, then the component completes, else the component continues at block 603. In block 603, the component calculates the global disparity. In block 604, the component invokes the perform lifting transform component to perform the lifting transform on the selected view and then loops to block 601 to select the next view.

Figure 7:
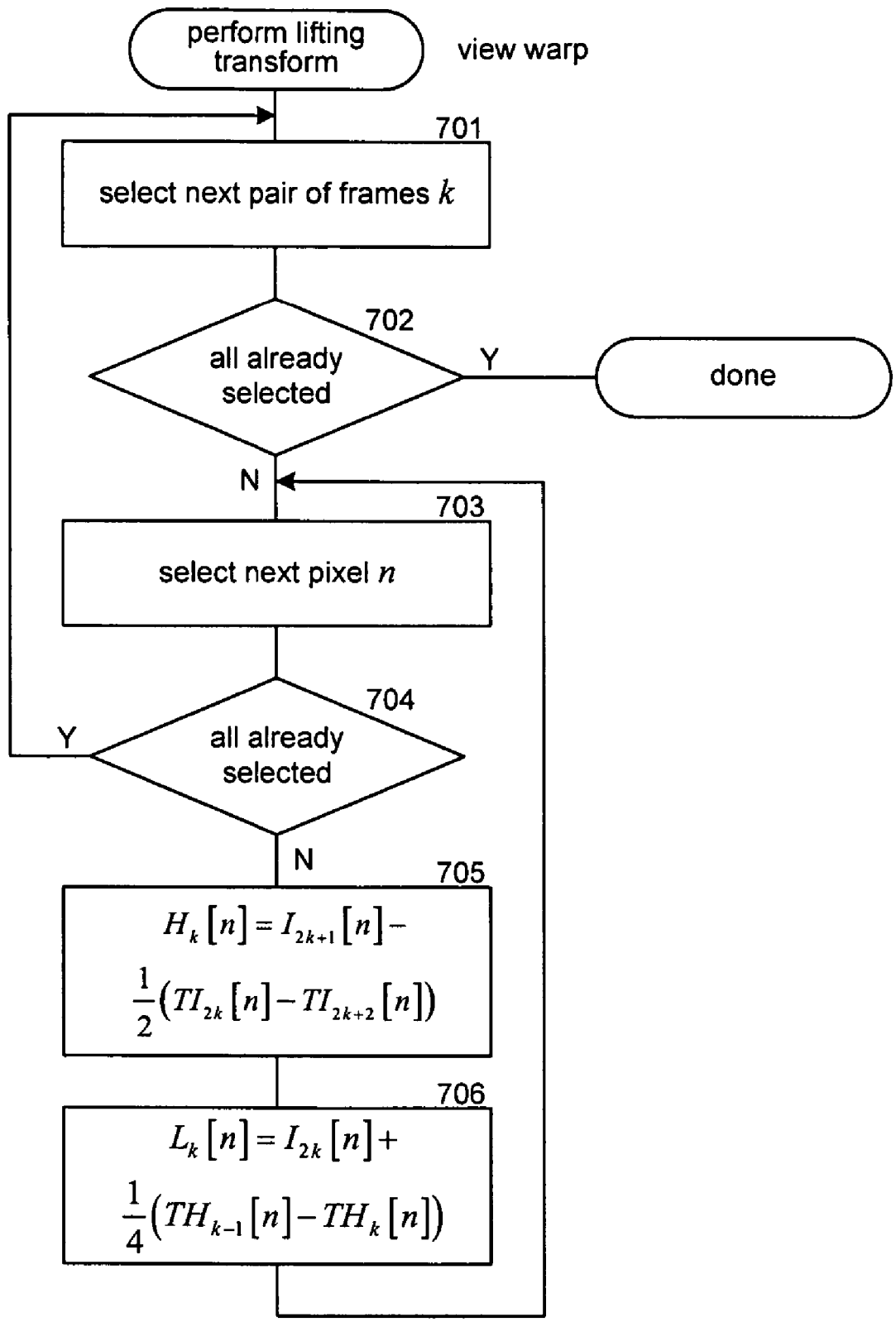
FIG. 7 is a flow diagram that illustrates the processing of a perform lifting transform component in one embodiment.

FIG. 7 is a flow diagram that illustrates the processing of a perform lifting transform component in one embodiment. The component loops through pairs of frames and performs the lifting transform. In block 701, the component selects the next pair of frames. In decision block 702, if all the frames have already been selected, then the component completes, else the component continues at block 703. In blocks 703-706, the component loops selecting each pixel for the selected pair of frames. In block 703, the component selects the next pixel for the selected pair of frames. In decision block 704, if all the pixels have already been selected, then the component loops to block 701 to select the next pair of frames, else the component continues at block 705. In block 705, the component calculates the high pass subband component for the selected pixel. In block 706, the component calculates the low pass subband component for the selected pixel. The component then loops to block 703 to select the next pixel.

Figure 8:
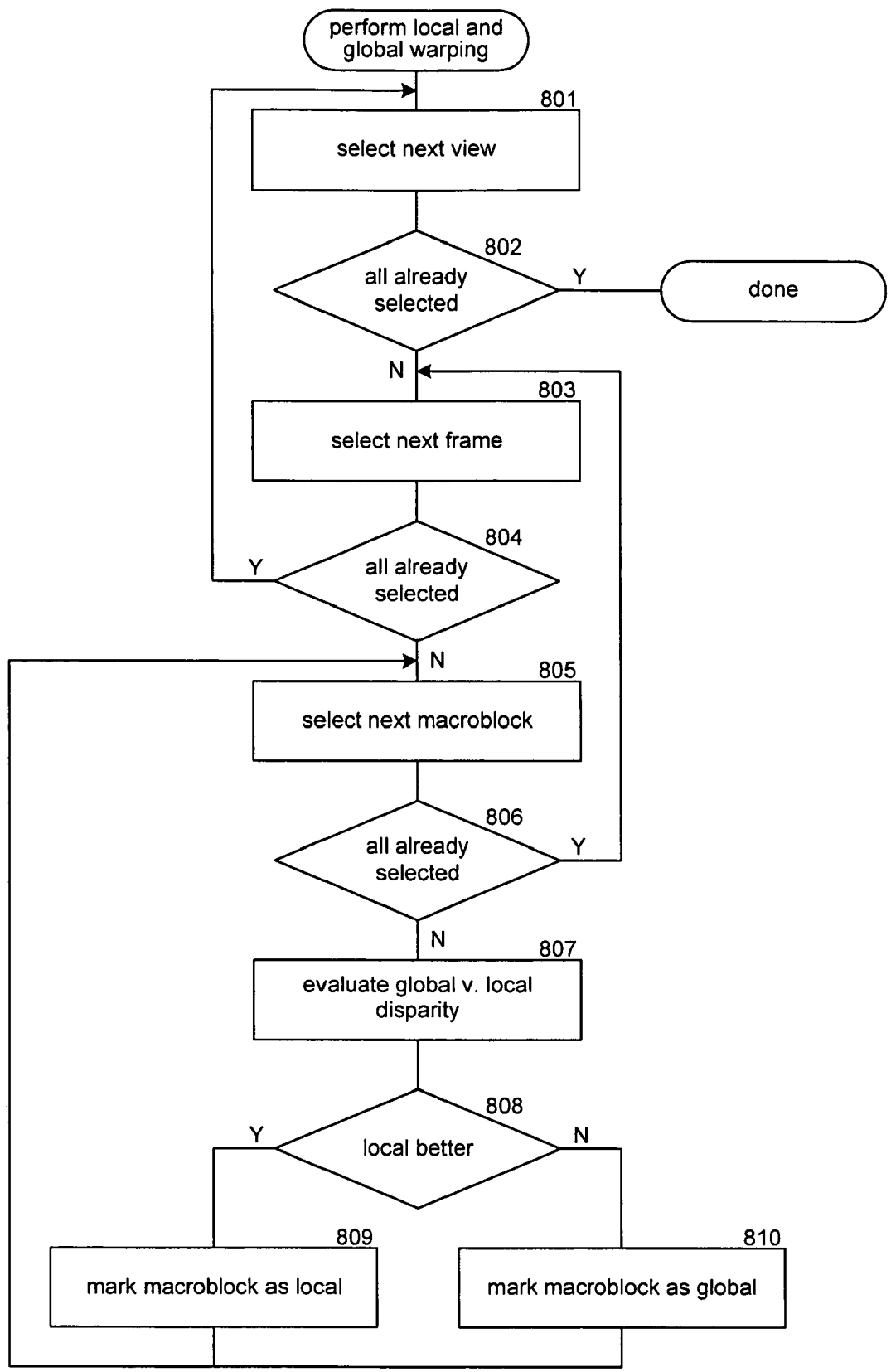
FIG. 8 is a flow diagram that illustrates the processing of a perform local and global warping component of the MVC system in one embodiment.

FIG. 8 is a flow diagram that illustrates the processing of a perform local and global warping component of the MVC system in one embodiment. In block 801, the component selects the next view. In decision block 802, if all the views have already been selected, then the component completes, else the component continues at block 803. In block 803, the component selects the next frame for the selected view. In decision block 804, if all the frames for the selected view have already been selected, then the component loops to block 801 to select the next view, else the component continues at block 805. In block 805 the component selects the next macroblock of the selected frame. In decision block 806, if all the macroblocks have already been selected, then the component loops to block 803 to select the next frame, else the component continues at block 807. In block 807, the component evaluates the global and local disparity compensation. In decision block 808, if the local disparity compensation is better, then the component continues at block 809, else the component continues at block 810. In block 809, the component marks the selected macroblock as local. In block 810, the component marks the selected macroblock as global. The component then loops to block 805 to select the next macroblock.

Figure 9:
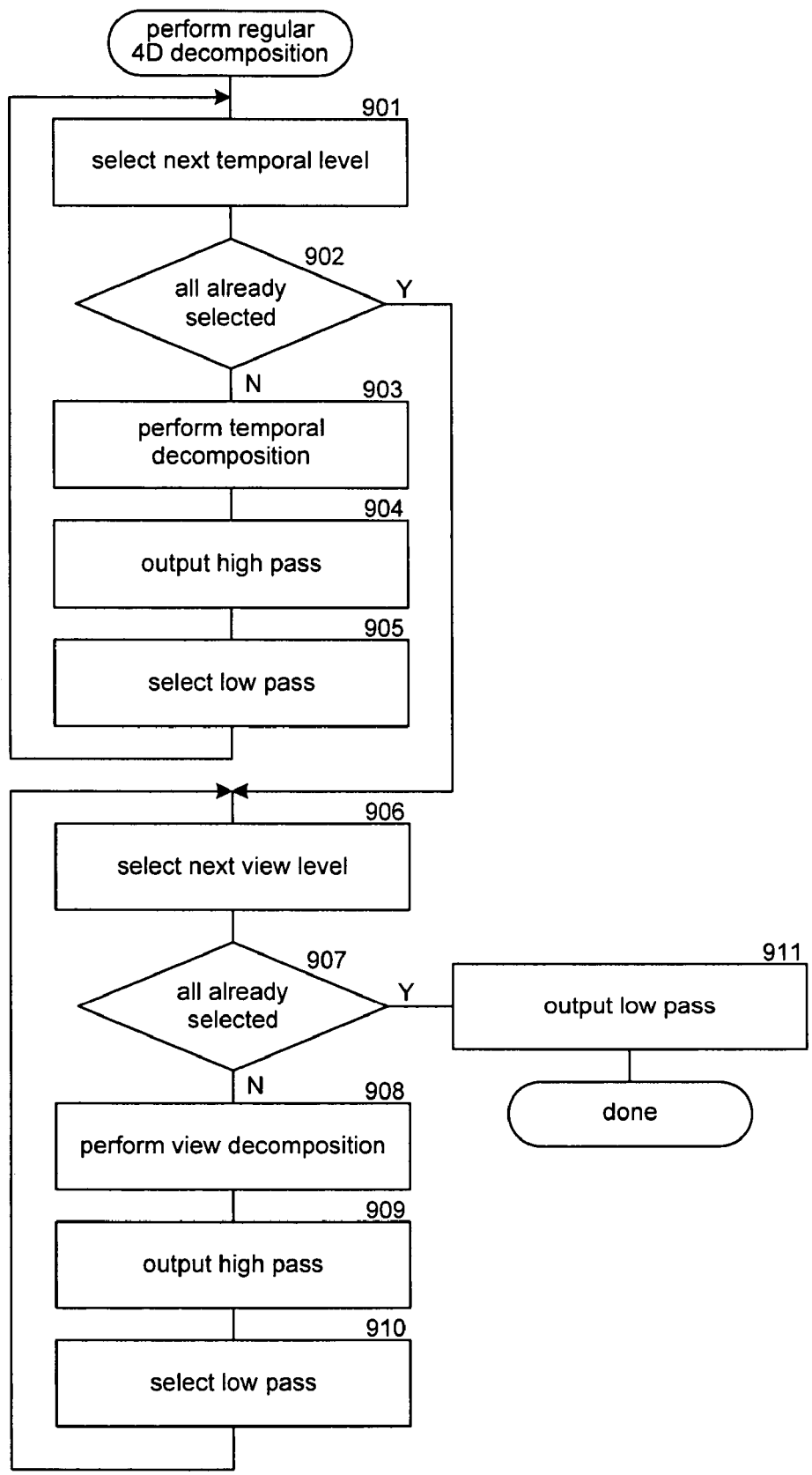
FIG. 9 is a flow diagram that illustrates the processing of a perform regular 4D decomposition component of the MVC system in one embodiment.

FIG. 9 is a flow diagram that illustrates the processing of a perform regular 4D decomposition component of the MVC system in one embodiment. The component performs temporal decomposition for the lowest levels and view decomposition for the highest levels. In blocks 901-905, the component loops selecting the temporal levels and applying temporal decomposition. In block 901, the component selects the next level for temporal decomposition. In decision block 902, if all the levels for temporal decomposition have already been selected, then the component continues at block 906, else the component continues at block 903. In block 903, the component performs temporal decomposition of the selected level. In block 904, the component outputs the high pass subband. In block 905, the component selects the low pass subband for further decomposition and then loops to block 901 to select the next level. In blocks 906-910, the component loops selecting view levels and performing view decomposition. In block 906, the component selects the next level for view decomposition. In decision block 907, if all the levels to be decomposed have already been selected, then the component continues at block 911, else the component continues at block 908. In block 908, the component performs view decomposition at the selected level. In block 909, the component outputs the high pass subband. In block 910, the component selects the low pass subband for further processing and loops to block 906 to select the next level. In block 911, the component outputs the selected low pass subband and then completes.

Figure 10:
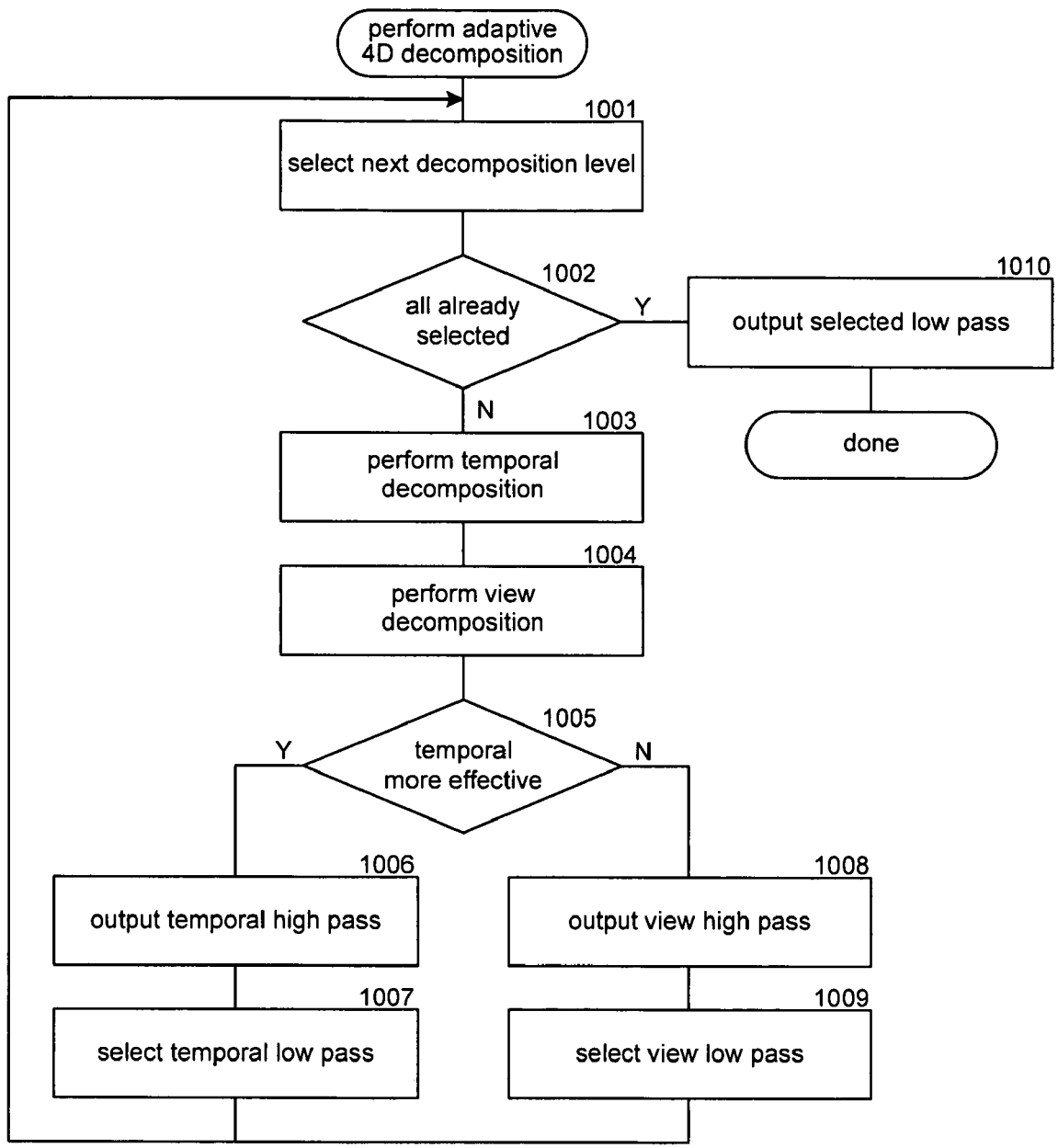
FIG. 10 is a flow diagram that illustrates the processing of a perform adaptive 4D decomposition component of the MVC system in one embodiment.

FIG. 10 is a flow diagram that illustrates the processing of a perform adaptive 4D decomposition component of the MVC system in one embodiment. The component determines whether temporal or view decomposition would be more effective and decomposes accordingly. In block 1001, the component selects the next decomposition level. In decision block 1002, if all the decomposition levels have already been selected, then the component continues at block 1010, else the component continues at block 1003. In block 1003, the component performs temporal decomposition of the selected level. In block 1004, the component performs view decomposition of the selected level. In decision block 1005, if the temporal decomposition is more effective than the view decomposition, then the component continues at block 1006, else the component continues at block 1008. In block 1006, the component outputs the temporal high pass subband. In block 1007, the component selects the temporal low pass subband for further decomposition. In block 1008, the component outputs the view high pass subband. In block 1009, the component selects the view low pass subband for further decomposition. The component then loops to block 1001 to select the next decomposition level. In block 1010, the component outputs the selected low pass subband and then completes.

Figure 11:
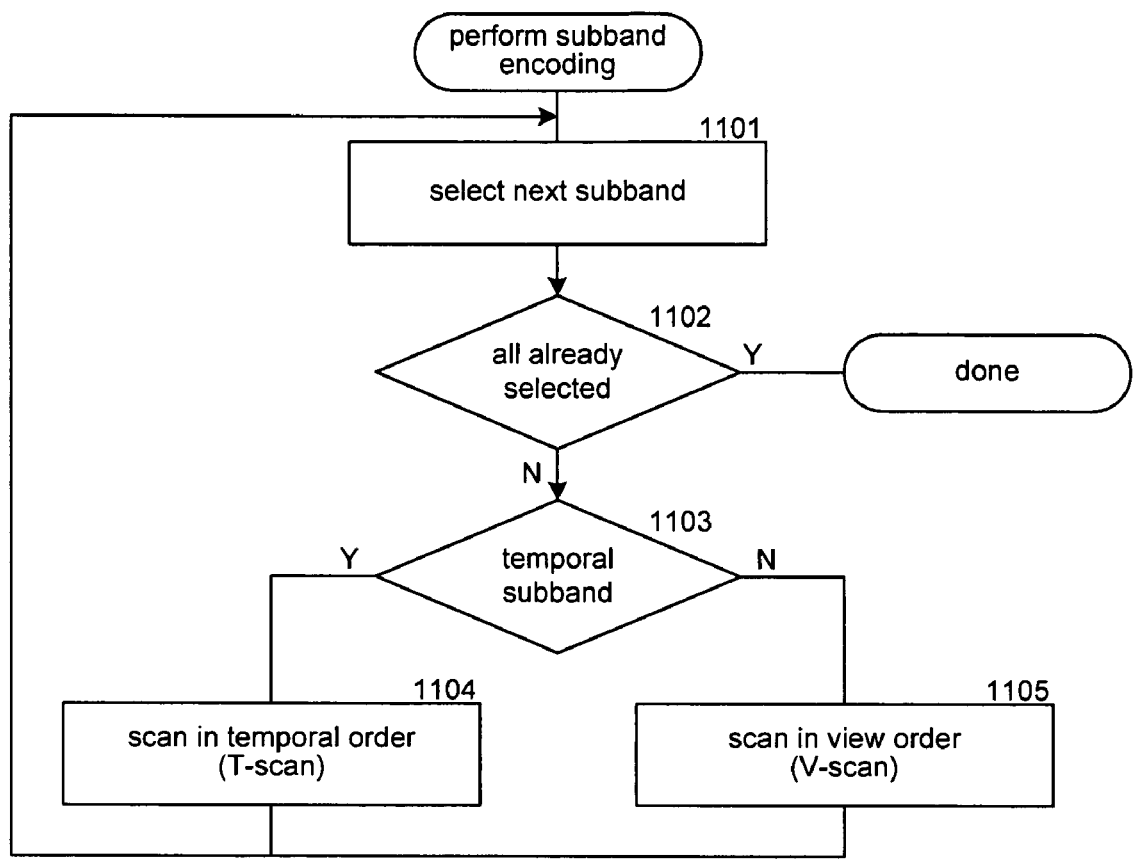
FIG. 11 is a flow diagram that illustrates the processing of a perform subband encoding component of the MVC system in one embodiment.

FIG. 11 is a flow diagram that illustrates the processing of a perform subband encoding component using T-scan for temporal subbands and V-scan for view subbands of the MVC system in one embodiment. In block 1101, the component selects the next subband. In decision block 1102, if all the subbands have already been selected, then the component completes, else the component continues at block 1103. In decision block 1103, if the selected subband is a temporal subband, then the component continues at block 1104, else the component continues at block 1105. In block 1104, the component scans in temporal order and then loops to block 1101 to select the next subband. In block 1105, the component scans in view order and then loops to block 1101 to select the next subband. A component for scanning in head-to-tail order is similar except that blocks 1104 and 1105 perform head-to-tail scans.

Although the subject matter has been described in language specific to structural features and/or methodological acts, it is to be understood that the subject matter defined in the appended claims is not necessarily limited to the specific features or acts described above. Accordingly, the invention is not limited except as by the appended claims.

We claim:

1. A method for coding a multi-view video having multiple views, comprising:
    providing a multi-view video; and
    for each of a plurality of decomposition levels, under control of computing device:
        selecting either a temporal decomposition or a view decomposition; and
        transforming the multi-view video at the decomposition level based on the selected decomposition by when the view decomposition is selected, for each macroblock of each frame of each view:
            evaluating a global disparity compensation for the macroblock based on a global disparity model for the view decomposition that represents disparity between adjacent views of the multi-view video;
            evaluating a local disparity compensation for the macroblock based on a local disparity model for the view decomposition that represents disparity between a corresponding macroblock of adjacent view of the multi-view video;
            determining whether local disparity compensation or the global disparity compensation provides better disparity compensation for the macroblock;
            when the local disparity compensation provides better disparity compensation, transforming the macroblock based on the local disparity model for the view decomposition; and
            when the global disparity compensation provides better disparity compensation, transforming the macroblock based on the global disparity model for the view decomposition
wherein temporal decomposition is selected for at least one decomposition level and view decomposition is selected for at least one decomposition level.

2. The method of claim 1 wherein the transforming includes factoring in a view disparity between temporally similar frames from different views.

3. The method of claim 1 wherein the global disparity model is represented by a six-parameter affine model derived from characteristics of a camera associated with each view.

4. The method of claim 1 wherein the transforming includes performing the same lifting transform for a macroblock with the global disparity model and a macroblock with a local disparity model.

5. The method of claim 1 wherein when the transforming of a macroblock with a local disparity model is an energy distributed update, the transforming of a macroblock with a global disparity model includes performing an energy distributed update on the macroblock with the global disparity model.

6. The method of claim 1 wherein the selecting includes selecting temporal decomposition for a first decomposition level and selecting view decomposition for a second decomposition level.

7. The method of claim 1 including, for a decomposition level, determining whether to select temporal decomposition or view decomposition based on a metric indicating effectiveness of the temporal decomposition and view decomposition at that decomposition level.

8. The method of claim 1 wherein the selecting of temporal decomposition or view decomposition is based on effectiveness of the decomposition.

9. The method of claim 1 including coding the transformed multi-view video on a decomposition-level basis.

10. The method of claim 9 wherein when the decomposition level is transformed based on temporal decomposition, scanning the decomposition level in a temporal scan order, and when the decomposition level is transformed based on view decomposition, scanning the decomposition level in view scan order.

11. A computer-readable storage device containing computer-executable instructions for coding a multi-view video having multiple views, by a method comprising:
    for each of a plurality of decomposition levels,
        selecting either a temporal decomposition or a view decomposition based on effectiveness of decomposition based on the estimated effectiveness according to the following equation:

$$HCost=SAD(H)+\lambda R(MV)$$

where HCost represents the nearness of a high pass subband to zero, SAD(H) represents the sum of the absolute differences of samples in the high pass subband H obtained from the decomposition, R(MV) represents the bit rate for coding disparity, and $\lambda$ represents a Lagrangian parameter, such that temporal decomposition is selected for at least one decomposition level and view decomposition is selected for at least one decomposition level; and
    transforming the multi-view video at the decomposition level based on the selected decomposition by when the view decomposition is selected, for each macroblock of each frame of each view:
        evaluating a global disparity compensation for the macroblock based on a global disparity model for the view decomposition;
        evaluating a local disparity compensation for the macroblock based on a local disparity model for the view decomposition;
        determining whether local disparity compensation or the global disparity compensation provides better disparity compensation for the macroblock;
        when the local disparity compensation provides better disparity compensation, transforming the macroblock based on the local disparity model for the view decomposition; and
        when the global disparity compensation provides better disparity compensation, transforming the macroblock based on the global disparity model for the view decomposition.

12. The computer-readable storage device of claim 11 wherein the transforming includes factoring in a view disparity between temporally similar frames from different views.

13. The computer-readable storage device of claim 11 wherein temporal decomposition is selected for at least one decomposition level and view decomposition is selected for at least one decomposition level.

* * * * *